United States Patent [19]

Nozaki et al.

[11] Patent Number: 4,894,954
[45] Date of Patent: Jan. 23, 1990

[54] WEATHER STRIP FOR VEHICLE

[75] Inventors: Masahiro Nozaki; Hisayuki Kisanuki, both of Ama; Mitsuo Hamabata, Bisai, all of Japan

[73] Assignee: Toyoda Gosei Co., Ltd., Nishikasugai, Japan

[21] Appl. No.: 271,279

[22] Filed: Nov. 15, 1988

[30] Foreign Application Priority Data

Dec. 24, 1987 [JP] Japan .................................. 62-327640
Jun. 20, 1988 [JP] Japan ............................. 63-81422[U]

[51] Int. Cl.<sup>4</sup> ................................................ E06B 7/16
[52] U.S. Cl. ......................................... 49/479; 49/373
[58] Field of Search .................... 49/479, 373, 374, 488

[56] References Cited

U.S. PATENT DOCUMENTS 4,616,446 10/1986 Okamoto ............................... 49/479
4,817,336 4/1989 Kisanuki ................................ 49/479

FOREIGN PATENT DOCUMENTS 61-32809 9/1986 Japan .
63-193915 12/1988 Japan .
0765794 1/1976 United Kingdom .................. 49/479

Primary Examiner—Kenneth J. Dorner
Assistant Examiner—Gerald A. Anderson
Attorney, Agent, or Firm—Cushman, Darby & Cushman

[57] ABSTRACT

A weather strip to be attached along a door frame and a door west line of a vehicle has extruded weather strips extending along the door frame and the door west line, respectively, and an L-shaped molded corner member connecting ends of respective extruded weather strips. The extruded weather strip extending along the door west line is composed of an outer weather strip and an inner weather strip, each being provided with a flocked seal lip to come in sliding contact with respective surfaces of a window glass. The L-shaped molded corner member is composed of an outer corner portion and an inner corner portion, each having an extruded and flocked extension seal lip integrally formed with the flocked seal lip of each of the outer weather strip and the inner weather strip. The extruded and flocked extension seal lip is fitted in each of opposed surfaces of the outer corner portion and the inner corner portion of the L-shaped molded corner member.

7 Claims, 5 Drawing Sheets

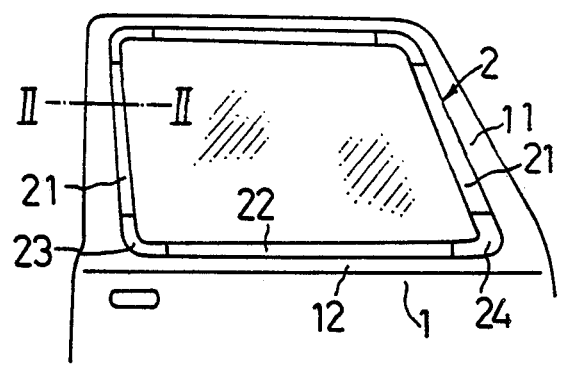
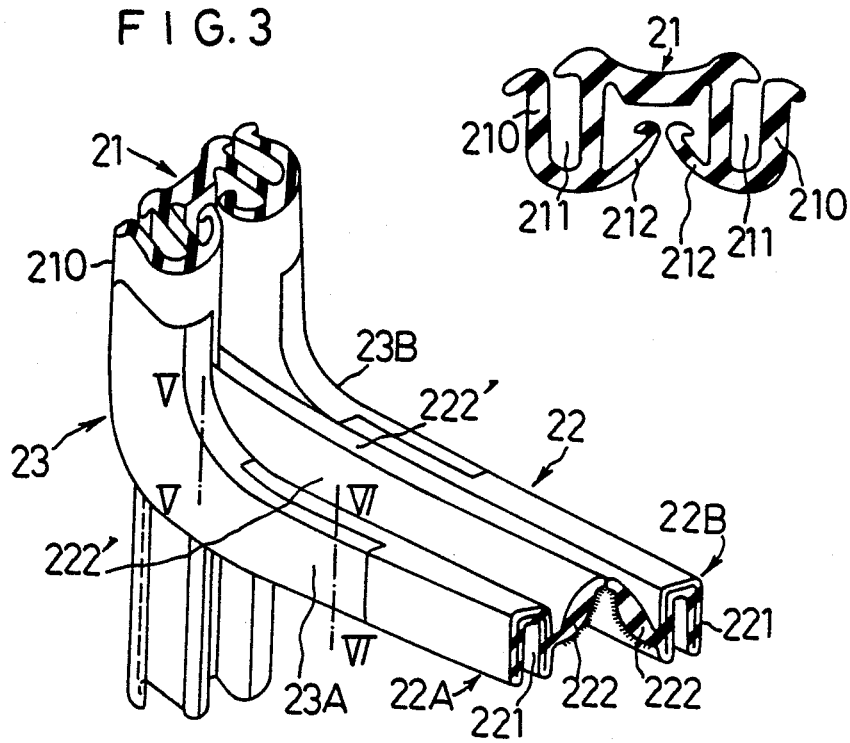

WEATHER STRIP FOR VEHICLE

BACKGROUND OF THE INVENTION

1. Field of the Invention:

The present invention relates to a weather strip to be attached to a door of an automobile, and more particularly to a structure of a corner portion thereof.

2. Description of the Prior Art:

As shown in FIG. 1, along a door frame 11 and a west line 12 of a door 1 of an automobile is attached a weather strip 2. The weather strip 2 is provided with corner members 23 and 24 which are formed by connecting extruded straight weather strips 21 and 22 by molding.

FIG. 12 illustrates a molded corner member 23 at a rear end of the west or belt line 12. The corner member 24 at a front end of the west line 12 has substantially the same construction as that of the corner member 23.

The molded corner member 23 extends in a L shape from side surfaces of a lower end portion of an extruded weather strip 21 to be attached to the door frame 11, and an end thereof is connected to another extruded weather strip 22 extending along the west line 12. The molded corner member 23 is divided into an outer portion 23A and an inner portion 23B. The outer portion 23A and the inner portion 23B are provided with oppositely facing seal lips 232.

The extruded weather strip 22 extending along the west line 12 is composed of an outer weather strip 22A and an inner weather strip 22B, each having the same sectional shape as that of each of the outer portion 23A and the inner portion 23B of the molded corner member 23. The outer weather strip 22A is attached to a flange of an outer panel of the door 1 while the inner weather strip 22B is attached to a flange of an inner panel thereof so that seal lips 222 are opposed to each other. And a window glass moves up and down between the seal lips 222 and 232 of the outer side and the seal lips 222 and 232 of the inner side.

The seal lip of the weather strip is required to have good slidability relative to the window glass since they come in sliding contact with the window glass moving up and down. Accordingly, conventionally, lubricity-treatment such as flocking or lubricant-coating has been performed on the seal lip after the weather strip is extruded.

The seal lip of the molded corner member is also desired to be subjected to the lubricity-treatment. However, it is remarkably troublesome to treat the seal lip of the corner member for giving it lubricity or slidability after the corner member is molded together with ends of the extruded weather strips.

SUMMARY OF THE INVENTION

It is an object of the present invention to provide a weather strip, and more particularly to provide a corner structure having a seal lip to which lubricity or slidability is given without any troublesome lubricity-treatment after molding.

The weather strip according to the present invention is obtained by jointing ends of extruded weather strips to be attached along an inner periphry of the door frame and along the west or belt line, respectively, through a molded corner member.

In an end portion of the extruded weather strip extending along the west line is formed an extension seal lip projecting therefrom. This extension seal lip is fitted in the molded corner member to form the seal lip thereof. This results in the seal lip being continuously formed in the weather strip extending along the west line.

The above-described extension seal lip can be formed by cutting off the end portion of the extruded weather strip for the west line by a predetermined length, leaving the seal lip thereof.

The above described extension seal lip can be also formed by forming a strip-shaped seal lip body by extrusion, cutting the formed seal lip body to obtain a seal lip piece of a predetermined length and connecting the obtained seal lip piece to an end of the extruded weather strip for the west line in an extension direction thereof.

According to the present invention, after the seal lip of each of the extruded weather strips for the door frame and the west line, and the extension seal lip are treated for giving them lublicity or slidability, they are connected to each other by the molded corner member. This results in the lubricity-treated seal lip of the molded corner member being obtained by virtue of the lubricity-treated extension seal lip without any troublesome treatment.

BRIEF EXPLANATION OF THE DRAWINGS

FIG. 1 is a front view of an upper portion of a door to which a weather strip is attached;

FIG. 2 through 6 illustrate one embodiment of a weather strip according to the present invention;

FIG. 2 is a sectional view taken along the line II—II of FIG. 1;

FIG. 3 is a perspective view of a corner portion of the weather strip;

FIG. 4 is a perspective view of an end portion of the weather strip extending along the west line, which is provided with an extension seal lip;

FIG. 5 is a sectional view taken along the line V—V of FIG. 3;

FIG. 6 is a sectional view taken along the line VI—VI of FIG. 3;

FIG. 7 is a perspective view of a corner portion of the weather strip;

FIG. 8 is a perspective view of an extension seal lip;

FIG. 9 is a sectional view taken along the line IX—IX of FIG. 7;

FIG. 10 is a sectional view taken along the line X—X of FIG. 7;

DETAILED DESCRIPTION OF THE EMBODIMENTS

Figure 4:
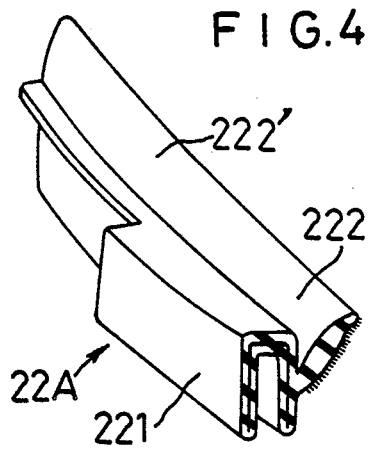

Hereinafter, the present invention will be explained in accordance with embodiments with reference to the drawings.

FIGS. 2 through 6 illustrate a first embodiment of the weather strip according to the present invention.

As shown in FIG. 1, a weather strip 2 is continuously attached to a door frame 11 and a west or belt line 12 of a door 1 of an automobile. The weather strip 2 is made of rubber. And an extruded straight weather strip 21 along the door frame 11 and an extruded straight weather strip 22 along the west line 12 are connected by molded corner members 23 and 24. As shown in FIG. 2, the extruded weather strip 21 extending along the door frame 11 is provided with two retaining lips 210, each forming a base 211 of a U-shaped section, to be retained by a flange of the door frame 11, and a pair of seal lips 212 projecting from an open end of a main body in opposed directions and longitudinally extending in parallel with each other so as to come in closely contact with both surfaces of the side periphery of a window glass.

As shown in FIG. 3, the retaining lips 210 (FIG. 2) of a lower end portion of the extruded weather strip 21 are cut off. And to the end of the weather strip 21 is connected a corner member 23 extending in the form like a letter L by molding.

The molded corner member 23 is composed of an outer portion 23A and an inner portion 23B.

Figure 5:
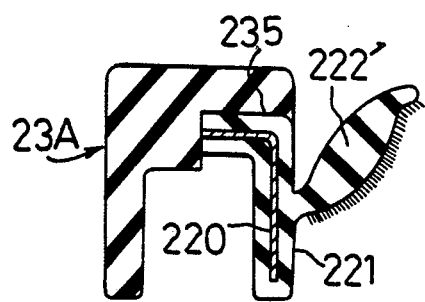
Figure 6:
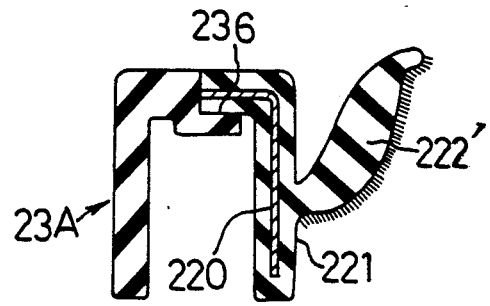

Each of the outer portion 23A and the inner portion 23B has a nearly letter L-shaped section as shown in FIGS. 5 and 6 (which show 23A only), and is provided with a downward step 235 near the corner as shown in FIG. 5 and an upward step 236 near the weather strip 22 as shown in FIG. 6.

The weather strip 22 extending along the west line 12 is composed of an outer weather strip 22A and an inner weather strip 22B, each being provided with a base 221 of a letter U-shaped section and a seal lip 222. The outer half of the base 221 of the end portion of each of the weather strips 22A and 22B is cut off as shown in Figs. 3 and 4 to form an extension seal lip 222'. The seal lips 222 and the extension seal lips 222' are flocked after the extruding step. In FIGS. 5 and 6, reference numeral 220 designates an insert made of a sheet metal.

The weather strip 2 of the present embodiment is attached to a door of an automobile in the following steps:

To the end of the extruded weather strip 21 provided with the flocked seal lips 212 is connected the corner member 23 by molding. The weather strip 21 to which the corner member 23 is connected is attached to the door frame 11 in its bases 211.

In each of the end portions of the outer weather strip 22A and the inner weather strip 22B, each having the seal lip 222 flocked after the extruding step, is formed the extension seal lip 222' as shown in FIG. 4. These weather strips 22A and 22B are attached to upper edges of a door outer panel and a door inner panel, respectively, so that end surfaces thereof abuts on the respective end surfaces of the outer portion 23A and the inner portion 23B of the corner member 23. Then, the extension seal lips 222' are fitted in the corner member 23 as shown in FIGS. 5 and 6. In the corner member 24 at the front end of the west line, the weather strips extending along the door frame 11 and the west line 12, respectively, are connected to each other similarly to the case of the corner member 23.

This results in the seal lips 222 and 222' which are flocked, being continuously formed over the whole length of the west line 12. And the ends of the flocked extension seal lips 222' of the weather strips 22A and 22B extending along the west line 12 are connected to the respective flocked seal lips 212 of the weather strip 21 extending along the door frame 11.

Hereinafter, a second embodiment of a weather strip according to the present invention will be explained.

The seal lips 212 of the extruded weather strip 21 to be attached to the door frame 11 are coated with polyurethane in order to give lubricity thereto. And the seal lips 222 and the extension seal lips 222' of the extruded weather strip 22 to be attached along the west line 12 are also coated with polyurethane in order to give lubricity thereto. End portions of the weather strip 21, and the extension seal lips 222' of the weather strip 22 are set in a cavity of a mold so as to be opposed to each other at a nearly right angle. Then, a rubber material is poured into the cavity to mold the corner member 23.

This results in the weather strips 21 and 22 being connected to each other through the molded corner member 23, and the weather strip 2 wherein the extension seal lip 222' acts as the seal lip for the corner member 23 being obtained. The obtained weather strip 2 is attached along the door frame 11 and the west line 12.

A third embodiment of the weather strip according to the present invention will be explained with reference to FIGS. 7 through 10.

Figure 7:
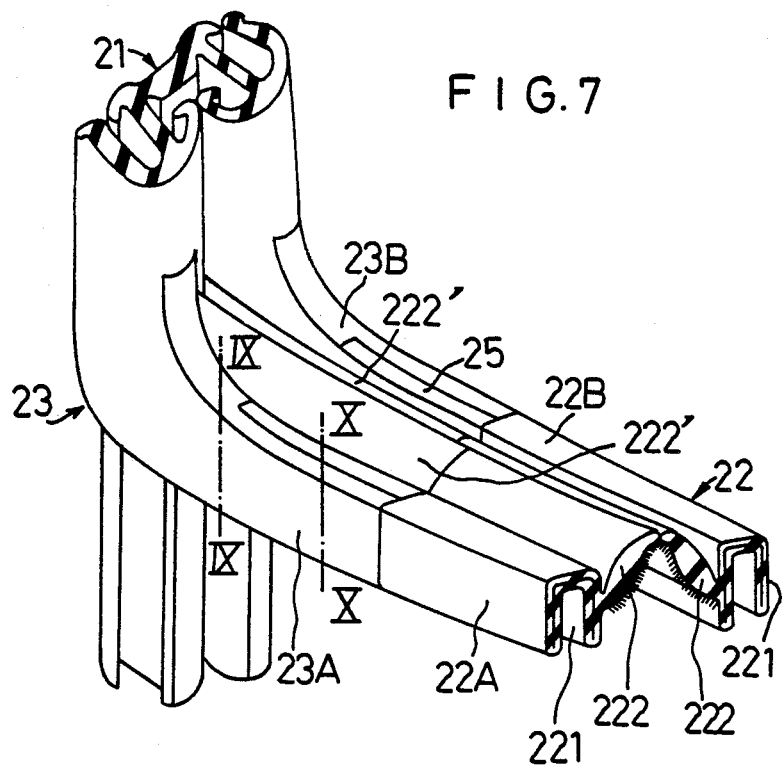
FIGS. 7 through 10 illustrate another embodiment of the weather strip according to the present invention.

As shown in FIG. 7, in the molded corner member 23 for connecting the extruded weather strip 21 and the outer and inner weather strips 22A and 22B, are fitted extruded extension seal lip pieces 25 which are separated from the weather strips 22A and 22B. In FIG. 7, parts similar to those shown in FIG. 3 are designated by the same reference numerals.

Figure 8:
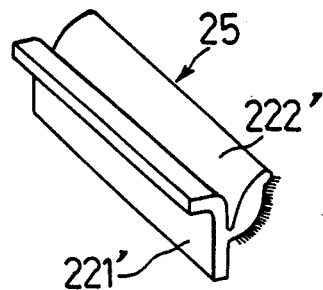
Figure 9:
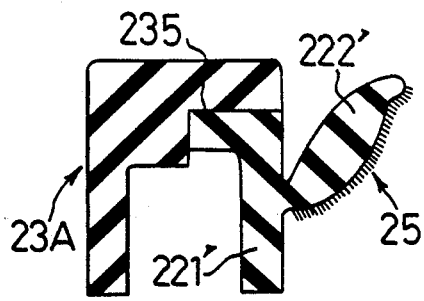
Figure 10:
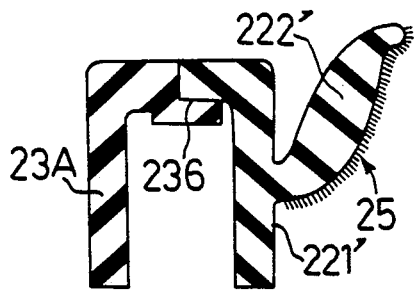

FIG. 8 illustrates the seal lip piece 25 to be fitted in the corner member 23. The molded corner member 23 has a shape of which an inner half is cut off as shown in FIGS. 9 and 10 (which show the outer portion 23A only). In this cut portion is fitted the seal lip piece 25. The seal lip piece 25 is composed of a base 221' of a sectional shape equal to the above-described cut portion, and a seal lip 222' of a sectional shape equal to that of the seal lip 222 of the weather strip 22, which inwardly projects from the base 221' so as to be integral therewith.

The seal lip piece 25 is obtained by forming a strip-shaped seal lip body by extrusion, flocking the seal lip 222' thereof and cutting the flocked seal lip body into the length corresponding to the above described cut portion of the corner member 23. The obtained seal lip piece 25 is fitted in the outer portion 23A of the corner memer 23 under the step 235 and on the step 236 as shown in FIGS. 7, 9 and 10. A similar seal lip piece 25 is also fitted in the inner portion 23B. This results in the seal lips 222 and 222' being connected as one body.

One example of the producing methods of the corner member 23 having the above-described structure is as follows: A lower end portion of the extruded weather strip 21 having the lubricity-treated seal lips 212, and one end portion of the weather strip 22 having the lubricity-treated seal lips 222 are disposed in a cavity of a mold so as to be opposed to each other at a nearly right angle. At this time, the seal lip pieces 25 are set in alignment with the respective seal lips 222 so that ends of the respective seal lip pieces 25 come in contact with ends of the outer weather strip 22A and the inner weather strip 22B of the weather strip 22. Then, a rubber material is poured into the cavity to mold the corner member 23 which connects the weather strips 21 and 22 to each other and is integrally provided with the seal lips 222'.

Figure 11:
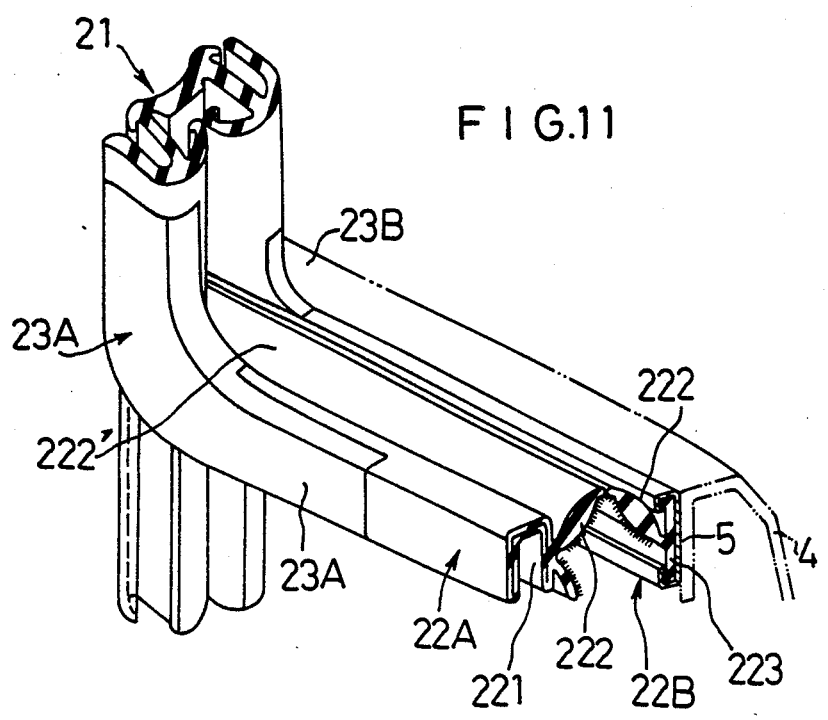
FIG. 11 is a perspective view of a corner portion of still another embodiment of the weather strip according to the present invention.
Figure 12:
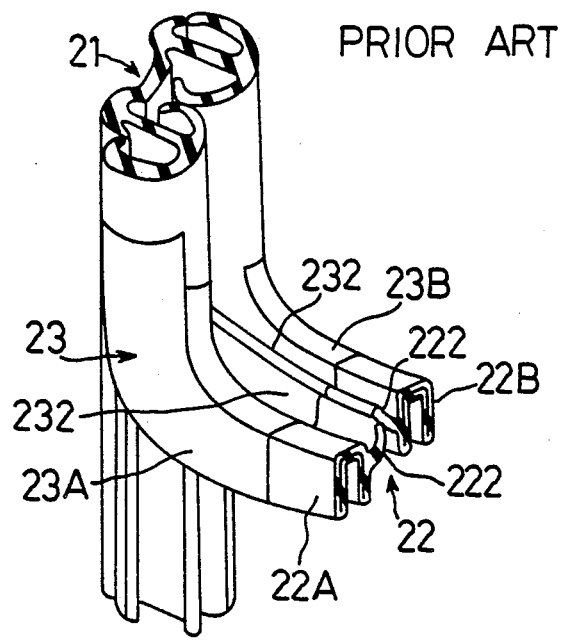
FIG. 12 is perspective view of a corner portion of the conventional weather strip.

FIG. 11 illustrates a fourth embodiment of a weather strip according to the present invention. In FIG. 11, the L-shape outer corner portion 23A is connected to an outer side surface of a lower end portion of the extruded weather strip 21 extending along the door frame by molding. And an end of the outer weather strip 22A extending along the door west line 12 is connected to an end of the outer corner portion 23A. The outer weather strip 22A is provided with the extension seal lip 222' extending from the end thereof similarly to the first embodiment, as shown in FIG. 4. The extension seal lip 222' is flocked as well as the seal lip 222. This outer weather strip 22A is attached to a flange formed along a west line 12 of a door outer panel in the base 221 so that the end of the weather strip 22A abuts on the end of the outer corner portion 23A. At this time, the extension seal lip 222' is fitted in the inner side surface of the outer corner portion 23A similarly to the first embodiment.

As shown in FIG. 11, the extruded inner weather stirp 22B extending along the door west line 12 is composed of a plate-shaped base 223 and a flocked seal lip 222 extending form the side surface thereof. The base 223 is fitted in a retainer 5 which is attached to a side surface of a trim 4 mounted along an upper edge of a door inner panel. Thus, the inner weather strip 22B is retained along the door west line 12. In this case, the end of the inner weather strip 22B is directly abuts on the weather strip 21. In the inner side of the lower end of the inner weather strip 22B is directly abuts on the weather strip 21. In the inner side of the lower end portion of the weather strip 21 is formed a small-sized inner corner portion 23B fy molding. This inner corner portion 23B comes in closely contact with the upper surface of the end portion of the retainer 5 when the weather strip 21 is attached to the door frame 11, and gives the connecting portion of the weather strip 21 and the inner weather strip 22B a corner shape similar to that of the outer corner portion 23A. The weather strip according to the present invention is provided with flocked continuous seal lips 222 and 222' on the outer side thereof, and a flocked continuous seal lip 222 on the inner side, which extending over the whole length of the door west line 12, respectively.

What is claimed is:

1. A weather strip to be attached along a door frame and a door belt line of a vehicle, comprising:
   one extruded weather strip extending along an inner periphery of the door frame, which is provided with a seal lip to come in sealing contact with a side periphery of a window glass;
   another extruded weather strip extending along the door belt line, which is provided with a seal lip to come into sliding contact with and seal against the door glass when the door glass is closed and is further provided with a means for engaging the door belt line of the vehicle;
   a molded corner member having a shape like a L and connected to one end of said extruded weather strip and to one end of said another extruded weather strip;
   an extruded extension seal lip fitted in a side surface of said molded corner member, said extruded extension seal lip extending from an end of said means for engaging in a longitudinal direction of said seal lip of said another weather strip so as to define a continuous sealing surface for coming into sliding contact with and to seal against the window glass when the window glass is closed;
   said seal lip of said one weather strip, said seal lip of said another strip and said extruded extension seal lip being respectively provided with a lubricity-treated layer on a surface thereof.

2. A weather strip according to claim 1, wherein said extension seal lip is composed of an extruded body integral with said another weather strip.

3. A weather strip according to claim 1, wherein said extension seal lip is composed of an extruded body separated from said another weather strip.

4. A weather strip according to claim 1, wherein said lubricity-treated layer is a flocked layer.

5. A weather strip according to claim 1, wherein said lubricity-treated layer is a polyurethane-coated layer.

6. A weather strip according to claim 1, wherein said another weather strip is composed of an outer weather strip and an inner weather strip which are parallel with each other and are provided with a seal lip to come in sliding contact with both surfaces of the window glass, respectively, an end of said outer weather strip is connected to an outer side surface of a lower end of said one extruded weather strip by an L-shaped molded outer corner portion while an end of said inner weather strip is connected to an inner side surface of said lower end of said one extruded weather strip by an L-shaped molded inner corner portion, said extension seal lip extends from said end of said inner weather strip and said outer weather strip, respectively, and is fitted in each of opposed surfaces of said inner corner portion and said outer corner portion.

7. A weather strip according to claim 1, wherein said another weather strip is composed of an outer weather strip and an inner weather strip which are parallel with each other and are provided with a seal lip to come in sliding contact with both surfaces of the window glass, respectively, an end of said outer weather strip is connected to an outer side surface of a lower end of said one extruded weather strip by an L-shaped molded outer corner portion while an end of said inner weather strip is directly connected to an inner side surface of said lower end of said one extruded weather strip, said extension seal lip extends from said end of said outer weather strip and is fitted in a side surface of said molded outer corner portion.

* * * * *